(12) United States Patent
McClements et al.

(10) Patent No.: US 12,419,326 B2
(45) Date of Patent: Sep. 23, 2025

(54) MEAT STRUCTURED PROTEIN PRODUCTS AND METHOD FOR THE MANUFACTURE THEREOF

(71) Applicant: University of Massachusetts, Boston, MA (US)

(72) Inventors: David Julian McClements, Northampton, MA (US); Zhiyun Zhang, Amherst, MA (US); Kanon Kobata, Amherst, MA (US); Hung Pham, Amherst, MA (US)

(73) Assignee: University of Massachusetts, Boston, MA (US)

( * ) Notice: Subject to any disclaimer, the term of this patent is extended or adjusted under 35 U.S.C. 154(b) by 402 days.

(21) Appl. No.: 18/094,476

(22) Filed: Jan. 9, 2023

(65) Prior Publication Data

US 2023/0232861 A1 Jul. 27, 2023

Related U.S. Application Data

(60) Provisional application No. 63/303,076, filed on Jan. 26, 2022.

(51) Int. Cl.
*A23J 3/22* (2006.01)
*A23J 3/14* (2006.01)
(Continued)

(52) U.S. Cl.
CPC .................. *A23J 3/227* (2013.01); *A23J 3/14* (2013.01); *A23J 3/26* (2013.01); *A23J 3/346* (2013.01); *A23L 29/231* (2016.08)

(58) Field of Classification Search
CPC ...... A23J 3/227; A23J 3/14; A23J 3/16; A23J 3/18; A23L 29/20; A23L 29/206;
(Continued)

(56) References Cited

U.S. PATENT DOCUMENTS

| 7,998,518 B2* | 8/2011 | Kweldam ................. A23J 3/10 426/574 |
| 2015/0296834 A1 | 10/2015 | Geistlinger |
| 2017/0105438 A1 | 4/2017 | Ajami et al. |

FOREIGN PATENT DOCUMENTS

| AU | 2019200777 A1 | 2/2019 |
| AU | 2021240241 A1 | 10/2021 |

OTHER PUBLICATIONS

"Structure formation and non-linear rheology of blends of plant proteins with pectin and cellulose", Food Hydrocolloids, 2022, 124, pp. 1-13 (Year: 2022).*
(Continued)

*Primary Examiner* — Changqing Li
(74) *Attorney, Agent, or Firm* — Stites & Harbison, PLLC

(57) ABSTRACT

A method of making a meat structured protein product includes combining a denatured plant protein and a polysaccharide in the presence of an aqueous solvent to provide a phase-separated mixture including a dispersed phase rich in polysaccharide and a continuous phase rich in the denatured plant protein. The method further includes forming fibrous structures of the polysaccharide in a protein matrix of the plant protein at a temperature of less than 100° C. The protein matrix can be crosslinked to provide the meat structured protein product. Meat structured protein products made by the method are also disclosed.

15 Claims, 8 Drawing Sheets

(51) Int. Cl.
  *A23J 3/26*  (2006.01)
  *A23J 3/34*  (2006.01)
  *A23L 29/231*  (2016.01)

(58) Field of Classification Search
  CPC .... A23L 29/212; A23L 29/219; A23L 29/225; A23L 29/231; A23L 29/238; A23L 29/244; A23L 29/25; A23L 29/256; A23L 29/262; A23L 29/269; A23L 29/271; A23L 29/27; A23L 29/272; A23L 29/273; A23L 29/274; A23L 29/275
  See application file for complete search history.

(56) References Cited

OTHER PUBLICATIONS

Dekkers, "Shear-induced fibrous structure formation from a pectin/SPI blend", Innovative Food Science and Emerging Technologies, 36 (2016) 193-200 (Year: 2016).*

Dekkers, "Understanding fiber formation in a concentrated soy protein isolate—Pectin blend", Journal of Food Engineering 222 (2018) 84-92 (Year: 2018).*

Dekkers, "Viscoelastic properties of soy protein isolate—pectin blends: Richer than those of a simple composite material", Food Research International 107 (2018) 281-288 (Year: 2018).*

Dekkers, "Structuring processes for meat analogues", Trends in Food Science & Technology 81 (2018) 25-36 (Year: 2018).*

* cited by examiner

MEAT STRUCTURED PROTEIN PRODUCTS AND METHOD FOR THE MANUFACTURE THEREOF

CROSS REFERENCE TO RELATED APPLICATION

This application claims priority to U.S. Provisional Application No. 63/303,076, filed Jan. 26, 2022, the contents of which are incorporated by reference herein in their entirety.

BACKGROUND

Consumers are increasing the number of plant-based foods in their diet due to environmental, health, and animal welfare concerns, including meat, seafood, egg, and dairy alternatives (see, e.g., Trends in Food Science & Technology, 118, 207-229; Lancet, 393(10170), 447-492). Seafood is an important source of protein in the human diet, as well as a good source of other health promoting nutrients like omega-3 fatty acids, vitamins, and minerals. However, overexploitation of wild seafood populations is depleting the oceans of these valuable resources. Moreover, climate change is altering fish migration patterns, with profound effects on the fishing industry and coastal communities. Wild seafood may also contain appreciable levels of toxins, especially mercury, persistent organic pollutants, and microplastics, which adversely affect human health (see, e.g., Marine Pollution Bulletin, 133, 336-348; Critical Reviews in Food Science and Nutrition, 57(17), 3715-3728). Seafood extraction and processing have also been reported to be a significant contributor to greenhouse gas (GHG) emissions. Finally, seafood such as fish and shellfish are a major source of allergens to a significant fraction of the population. The rapidly growing aquaculture industry alleviates some of these issues, but has its own challenges, including the need for protein-rich resources to feed the fish, as well as its propensity to cause pollution such as eutrophication (see, e.g., Nature, 588, S60-S62). There are also substantial losses in aquaculture due to diseases, such as sea lice in farmed salmon, which contribute to food waste and economic losses estimated to be around S6 billion per year. Moreover, there are concerns that the antibiotics and pesticides used to tackle these diseases may contaminate fish and the environment.

Accordingly, there remains a continuing need for plant-based meat structured protein products to alleviate many of these problems by creating an alternative to real seafood, thereby allowing existing seafood stocks to be managed more sustainably (see, e.g., Molecules 2021, 26(6), 1559).

SUMMARY

A method of making a meat structured protein product comprises combining a denatured plant protein and a polysaccharide in the presence of an aqueous solvent to provide a phase-separated mixture comprising a dispersed phase comprising the polysaccharide; and a continuous phase comprising the denatured plant protein; forming fibrous structures comprising the polysaccharide in a protein matrix comprising the plant protein at a temperature of less than 100° C.; and crosslinking the protein matrix to provide the meat structured protein product.

A meat structured protein product made by the method represents another aspect of the present disclosure.

The above-described aspects and other features are exemplified by the following figures and detailed description.

BRIEF DESCRIPTION OF THE DRAWINGS

The following figures represent exemplary embodiments.

DETAILED DESCRIPTION

Figure 1:
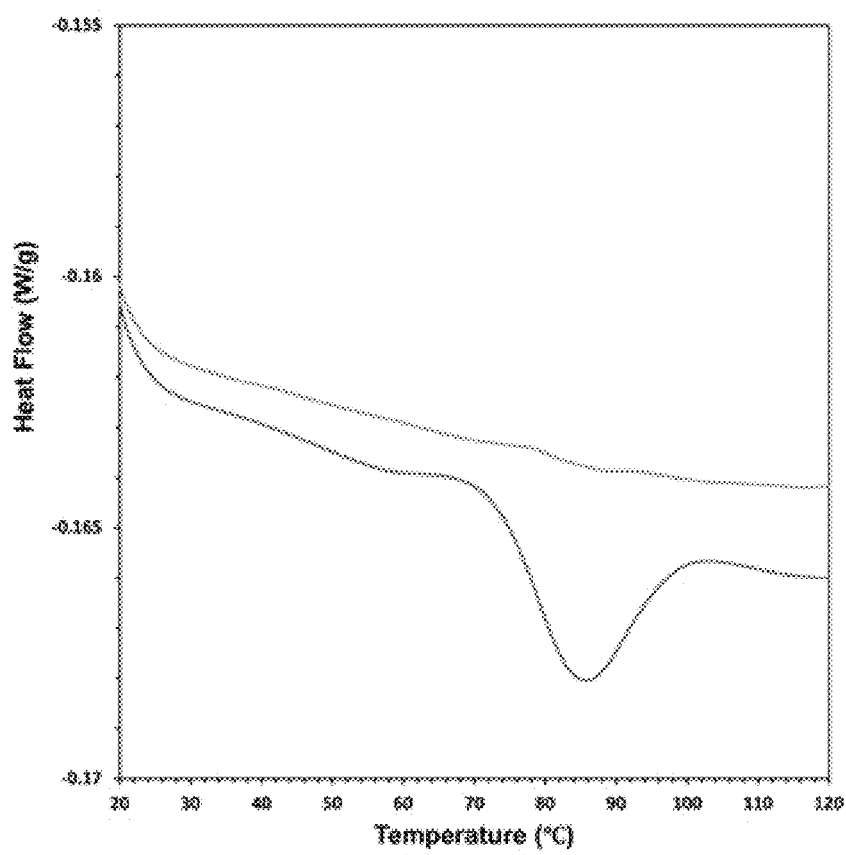
FIG. 1 is a plot of heat flow versus temperature for pea protein (20 wt %) when heated twice from 10 to 120° C. at a rate of 3° C./min.

To date, plant-based foods have been fabricated using several processing technologies, including extrusion, shear cell, spinning, and 3D printing methods (see, e.g., LWT-Food Science and Technology, 44(4), 957-962; Innovative Food Science & Emerging Technologies, 36, 193-200; Journal of Food Engineering, 222, 84-92; Food Research International, 64, 743-751; Journal of Texture Studies, 9(1-2), 125-134; Foods, 10(4), 697; Journal of agricultural and food chemistry, 67(38), 10713-10725; Critical Reviews in Food Science and Nutrition, 1-18). At present, extrusion is the most common technology for the industrial production of plant-based foods because of its simplicity, versatility, and scalability (see, e.g., Trends in Food Science & Technology, 102, 51-61). In this approach, plant-based materials can be heated and sheared under high pressure in a device that contains a barrel with a series of screws to mix and transport the materials. These processes change the solubility, conformation, and interactions of the proteins, which promotes the formation of protein aggregates. These aggregates are aligned in the direction of flow when the material passes through a long cooling die attached to the end of the extruder, leading to the creation of an anisotropic food matrix with meat-like structures and textures (*Critical Reviews* in Food Science and Nutrition, 290, 110283). The shear cell technology also has potential to produce plant-based foods on a commercial scale (Biomacromolecules, 8(4), 1271-1279; Trends in Food Science & Technology, 18(11), 546-557). This device has a cylinder-in-cylinder design, which consists of a heated stationary outer cylinder with a lid and a heated inner cylinder that is rotated via a drive shaft. Raw samples are pre-mixed and placed in the gap between the two cylinders. Unlike extrusion, the material deformation inside the shear device is well controlled and constant during the manufacturing process. However, both extrusion and shear cell technologies require specialized equipment and high energy inputs, which limits their suitability for smaller operations and leads to some environmental concerns. A simpler, cheaper, and more energy-efficient means of creating plant-based meat and seafood products would therefore be advantageous.

Phase separation of protein-polysaccharide mixtures due to thermodynamic incompatibility can be used to create microstructures and textures in foods (Food Hydrocolloids, 17(1), 1-23; Biotechnology Advances, 24(6), 626-628; Food proteins and their applications (pp. 171-198): CRC Press). This approach is based on the free energy of a phase separated mixture of two types of biopolymers that repel each is lower than that of an intimate mixture. The tendency for phase separation to occur is influenced by several factors, including the type and concentration of the biopolymers, as well as the pH and ionic strength of the surrounding solution (Food Chemistry, 307, 125536). After phase separation, the mixed biopolymer system can be stirred to form a "water-in-water" (w/w) emulsion, which consists of a dispersed phase rich in one kind of biopolymer and a continuous phase rich in the other kind of biopolymer. The droplets in w/w emulsions are characterized by a very low interfacial tension, which means they can be easily deformed and elongated into fiber-like structures by applying low shear stresses (see, e.g., Journal of Food Engineering, 222, 84-92). These structures can then be locked into place by promoting gelation of the dispersed and/or continuous biopolymer phase. This soft matter physics approach can therefore be used to create foods with meat-like structures and textures from plant proteins and polysaccharides.

Current sea scallop analogs use fish or whey proteins as structuring agents. Those plant-based scallops have protein concentrations (e.g., less than 2.5%) considerably below those of real scallop (e.g., 10 to 12%). These products tend to use starches and gums as structuring agents rather than proteins.

The present inventors have used the thermodynamic incompatibility approach to create meat (e.g., seafood or scallop) analogs from plant proteins and polysaccharides. In an aspect, pea protein and high methoxy citrus pectin were used as the protein and polysaccharide, respectively, to formulate a structured meat analog. These biopolymers have the advantage that pea protein is not a major allergen and citrus pectin is a dietary fiber. The pea protein concentration could be altered to simulate that of real meat (for example, a scallop) to match its nutritional content. The two biopolymers were mixed and blended to promote phase separation and fiber formation, placed in a mold, and then the pea proteins were crosslinked using a food-grade enzyme (e.g., transglutaminase) to lock the fiber structures in place and increase the gel strength. The structural and physicochemical properties of the plant-based structured meat analogs produced by this method were then compared to those of real sea scallops, including their microstructure, color, texture, water holding capacity, and cookability.

Accordingly, the present disclosure provides insight towards creating plant-based meat structured protein products, for example seafood analogs, with improved quality, nutritional profile, and cooking properties. The availability of these products could facilitate the transition to a more sustainable and environmentally friendly food supply.

An aspect of the present disclosure is a method of making a meat structured protein product. As used herein, the term "meat structured protein product" refers to a food product having a structure, texture, and other properties that are comparable to a meat (animal) product. In an aspect, the meat structured protein product can be a seafood analog. As used herein, the term "seafood analog" refers to an imitation seafood product, or a food product having a structure, texture, and other properties that are comparable to a seafood product. Preferably, the meat structured protein product does not contain any animal products.

The present inventors have unexpectedly discovered that a meat structured protein product can be prepared through a process which uses a pre-denatured plant protein (i.e., a plant protein which is denatured prior to contact with other components of the product). The denatured plant protein enables the use of mild process conditions to form the meat structured protein product. Specifically, high temperature and high-pressure conditions can be avoided. In an additional advantageous feature, no specialized equipment (e.g., shear cells, extruders, etc.) is needed for preparing the meat structured protein product. The method can be applied to a range of plant protein and polysaccharide compositions and concentrations. Further, additives including, but not limited to, omega-3 fatty acids, dietary fibers, vitamins, minerals, acids, bases, buffers, colors, flavors, preservatives, and nutraceuticals can be easily incorporated during mixing, for example to tune the taste, color, shelf-life, and nutrient profiles of the meat analog.

The method comprises combining a denatured plant protein and a polysaccharide in the presence of an aqueous solvent.

The protein may be derived from a plant source or from multiple plant sources, or it may be produced synthetically. In an aspect, at least some of the protein is derived from plant. In an aspect, the protein is not derived from a plant source but is identical or similar to protein found in a plant source, for example, the protein is synthetically or biosynthetically generated but comprises polypeptide molecules that have an identical or similar amino acid sequence as polypeptide molecules found in a plant source. In an aspect, no animal-derived protein is added.

The plant protein can comprise, for example, pea protein, corn protein (e.g., ground corn or corn gluten), wheat protein (e.g., ground wheat or wheat gluten such as vital wheat gluten), potato protein, legume protein such as soy protein (e.g., soybean meal, soy concentrate, or soy isolate), rice protein (e.g., ground rice or rice gluten), barley protein, algae protein, rubisco protein, hemp protein, mung bean protein, oat protein, *faba* bean protein, lupin protein, canola protein or combinations thereof.

In an aspect, the plant protein comprises pea protein. The term "pea protein" as used herein refers to protein present in pea. In an aspect, pea protein isolate can be used. The term "pea protein isolate" as used herein refers to the protein material that is obtained from pea upon removal of insoluble polysaccharide, soluble carbohydrate, ash, and other minor constituents. It typically has at least 80% protein on a dry-weight basis. The pea protein may be derived from whole pea or from a component of pea in accordance with methods generally known in the art. The pea may be a standard pea (i.e., non-genetically modified pea), commoditized pea, genetically modified pea, or combinations thereof.

The native plant protein is denatured prior to use in the present method (i.e., prior to combination with the polysaccharide). Denaturation conditions can depend on the identity of the plant protein selected and can be determined by the skilled person without undue experimentation, guided by the present disclosure. For example, the skilled person can select a suitable temperature, pH, ionic strength, and protein concentration based on the plant protein selected and its sensitivity to various conditions without undue experimentation. Thus, in an aspect, the method of the present disclosure can further comprise denaturing a native plant protein to provide the corresponding denatured plant protein. For example, the native plant protein can be heated at a temperature greater than the denaturation temperature of the plant protein, for example to a temperature of 50 to 150° C. for 2 minutes to 24 hours. For example, a temperature of 75 to 105° C. and a time of 2 to 60 minutes is mentioned. In an aspect, the protein concentration during the denaturation step can be 1 to 30 weight percent, or 1 to 20 weight percent, or 1 to 15 weight percent, or 5 to 15 weight percent, or 8 to 12 weight percent, each based on the total weight of the mixture (e.g., plant protein and aqueous solvent). In an aspect, the denaturation conditions can include a neutral pH, for example a pH of 6 to 8, or 6.5 to 7.5, or 6.8 to 7.2. Acidic pH (e.g., pH <6) and basic pH (e.g., pH >8) are also mentioned. In an aspect, salt can be present, for example at a concentration of 0.1 to 5 M, or 1 to 5 M, or 2.5 to 4 M. When present, suitable salts can include, for example, alkali metal halides (e.g., NaCl). In an aspect, no salt is present. In a specific aspect, the denaturation conditions can include a temperature of 75 to 105° C., a time of 2 to 60 minutes, a pH of 6.8 to 7.2, a protein concentration of 8 to 12 weight percent, and wherein no salt is present.

In an aspect, denaturing the native plant protein can optionally result in the formation of protein aggregates. As used herein, the term "aggregate" refers to a plurality (e.g., at least 2) of protein molecules held together by covalent interactions, noncovalent interactions, intermolecular disulfide bonds, and the like or a combination thereof. Aggregates can be soluble or insoluble in aqueous solution. In an aspect, the aggregates can be dimers, trimers, tetramers, pentamers, or a combination thereof. In another aspect, the aggregates can have an average size of, for example, 5 nm to 500 µm. Within this range, the aggregates can have an average size of 5 nm to 250 µm, or 5 nm to 100 µm, or 5 nm to 50 µm, or 5 nm to 25 µm, or 5 nm to 15 µm, or 5 nm to 5 µm, or 5 nm to 1 µm, or 5 nm to 750 nm, or 5 nm to 500 nm, or 1 to 5 µm, or 2 to 5 µm. "Average size" as used herein in relation to the aggregates refers to an average diameter or, if the aggregate is not spherical or substantially spherical in shape, average size can refer to an average of the largest dimension of the aggregates. For example, for a fibrous aggregate, the average size can refer to the average fibril length. Size of the aggregates can be determined, for example, by light scattering techniques. The aggregates can further have any shape, including, but not limited to spheroid, fibrous, linear, and branched. The formation of aggregates can depend, for example, on one or more of protein identity, protein concentration, temperature, pH, and ionic strength. Without wishing to be bound by theory, it is believed that the at least partial aggregation of the plant protein can aid in the desired phase separation from the polysaccharide via thermodynamic incompatibility. In as aspect, the denatured plant protein does not include any aggregates. In an aspect, 1 to 100 weight percent of the denatured plant protein (based on the total weight of the denatured plant protein) can be in aggregated form. Within this range, the denatured plant protein can comprise at least 5%, or at least 10%, or at least 15%, or at least 25%, or at least 30%, or at least 50%, or at least 60%, or at least 70% aggregated denatured plant protein. Also within this range, the denatured plant protein can comprise at most 90%, or at most 80%, or at most 70%, or at most 60%, or at most 50%, or at most 40%, or at most 30%, or at most 25%, or at most 15%, or at most 10%, or at most 5% aggregated denatured plant protein.

The polysaccharide, which can include modified polysaccharides, can comprise, for example, cellulose, methylcellulose, ethylcellulose, carboxymethylcellulose, hydropropylmethylcellulose, maltodextrin, carrageenan and its salts, alginic acid and its salts, agar, agarose, oat hydrocolloid, chitosan, cyclodextrin, ammonium alginate, calcium alginate, yeast beta-glucans, bioemulsans, dextran, curdlan, pullulan, scleroglucan, schizophyllan, pachyman, krestin, lentinan, grifolan, glomerellan, pestalotan, tylopilan, cinerean, kefiran, laminarin, fucoidan, glucuronan, pectins (e.g., pectin, agaropectin, low methoxyl pectin), hyaluronan, carbohydrates, starches, fibers, proteins (e.g., collagen, albumin, ovalbumin, milk protein, whey protein, soy protein, canola protein, alpha-lactalbumin, beta-lactoglobulin, globulins, seed proteins), natural gums (e.g., locust bean gum, gum arabic, gellan gum, xanthan gum, wean gum, succinoglycan gum), gelatins (e.g., gelatin A, gelatin B, Halal gelatin, non-Halal gelatin, Kosher gelatin, non-Kosher gelatin), polyphosphates, and other naturally derived polymers. In an aspect, the polysaccharide comprises pectin.

The denatured plant protein and the polysaccharide are combined in the presence of an aqueous solvent to provide a phase-separated mixture. The aqueous solvent comprises water. In an aspect, the aqueous solvent can be pure water, a buffered solution (e.g., phosphate buffered saline) an acidic solution, a basic solution, a salt solution, or the like. The specific aqueous solvent can be selected based on the specific protein and polysaccharide selected, and can modulate the protein-polysaccharide interactions, as will be understood by the skilled person. Accordingly, the skilled person would be able to select a suitable aqueous solvent using the guidance provided herein.

Combining the denatured plant protein and the polysaccharide in the aqueous solvent can provide a protein-rich aqueous phase and a protein-depleted aqueous phase. When the protein-rich phase is dispersed in the protein-depleted phase or vice versa (e.g., by stirring), the resulting phase separated mixture can be referred to as a water-in-water emulsion. Water-in-water emulsions are colloidal dispersions of an aqueous solution in another aqueous phase. Such dispersions can be formed in mixtures of at least two hydrophilic macromolecules or biopolymers, which are thermodynamically incompatible in solution, generating two immiscible aqueous phases. Accordingly, the plant protein and the polysaccharide are selected such that they are thermodynamically incompatible in water in order to provide the phase separated mixture. Thermodynamic incompatibility as used herein refers to the free energy of the phase separated system being lower than the free energy of the corresponding intimately mixed system, which occurs when there is a net repulsion between the protein and the polysaccharide and when the concentrations of the protein and the polysaccharide are above certain values.

The denatured plant protein can be present in the mixture in an amount of 5 to 50 weight percent, or 5 to 40 weight percent, or 5 to 30 weight percent, or 5 to 25 weight percent, or 8 to 15 weight percent, or 9 to 12 weight percent, based on the total weight of the mixture. The polysaccharide can be present in the mixture in an amount of greater than 0 to 20 weight percent, or 0.1 to 20 weight percent, or 0.1 to 15 weight percent, or 0.1 to 10 weight percent, or greater than 0 to 5 weight percent, or 0.1 to 5 weight percent, or 0.1 to 2 weight percent, based on the total weight of the mixture. The balance of the mixture can be water, such that the weight of all components totals 100 weight percent.

The phase separated mixture comprises a dispersed phase comprising the polysaccharide and a continuous phase comprising the denatured plant protein. As described previously, the dispersed phase of the phase separated mixture are characterized by a low interfacial tension, and thus can be easily deformed and elongated into fibrous structures upon application of shear forces. The fibrous structures can be locked into place by gelation (e.g., crosslinking) of the dispersed and/or the continuous phases.

Thus, the method further comprises forming fibrous structures comprising the polysaccharide in a protein matrix comprising the plant protein. Advantageously, due to the use of a pre-denatured plant protein, forming the fibrous fibers can be at relatively low temperatures, for example less than 100° C., or less than 75° C., or less than 50° C., or 15 to 50° C., or 15 to 30° C., or 15 to 25° C. Fibrous structures can be formed by applying a shear force. Preferably, the shear force is a low shear force. Any suitable mixer capable of providing low shear conditions can be used, for example, hand mixers, dough mixers, blenders, high shear mixers, food mixers, static mixers, batch mixers, planetary mixers, tank mixers, in-line mixers, stand mixers, portable mixers, paddle mixers, ribbon mixers and single and twin-screw extruders operated under low shear conditions. As used herein, "low shear conditions" can refer to, for example, shear rates of 0.1 to 200 $s^{-1}$. In an aspect, the shear force can be applied by stirring, for example using a magnetic stirrer. In an aspect, the method is preferably conducted at atmospheric pressure. Preferably, the method of the present disclosure does not use a shear cell or an extruder. In an aspect, a shear cell is not used in the present method. In an aspect, the method of the present disclosure does not use Couette flow to provide the shear conditions for forming the fibrous structures.

The fibrous structures can be substantially aligned within the protein matrix. The term "substantially aligned" as used herein refers to an arrangement of fibers such that a significantly high percentage (e.g., greater than 50%, or greater than 60%, or greater than 75%, or greater than 85%, or greater than 90%) of the fibers are contiguous to each other at less than a 45° angle when viewed in a horizontal plane. Methods for determining the degree of fiber alignment include visual determination based upon photographs and micrographic images. In an aspect, the fibrous structures can be anisotropic.

The fibrous structures can have any dimensions which are effective to provide the meat structured protein product. In an aspect, the fibrous structures can have an average length of 10 micrometers to 10 millimeters. In an aspect, the fibrous structures can have an average diameter of 1 nanometer to 1000 micrometers. In an aspect, the fibrous structures can have an average diameter of 10 to 200 micrometers, and an aspect ratio (i.e., length/diameter ratio) of greater than 5. Average length and diameter can be determined, for example, based upon micrographic images (e.g., obtained using scanning electron microscopy).

The method further comprises crosslinking the protein matrix to provide the meat structured protein product. In an aspect, crosslinking can be by enzymatic crosslinking of the protein matrix. Accordingly, in an aspect, an enzymatic crosslinking agent can be added to the mixture. The enzymatic crosslinking agent can be added at any suitable time, for example before, during, or after formation of the fibrous structures. In an aspect, the crosslinking agent can comprise a transglutaminase.

The enzymatic crosslinking agent can be present in the mixture in an amount of 0.001 to 1 weight percent, based on the total weight of the mixture. Within this range, the enzymatic crosslinking agent can be present in an amount of 0.0025 to 0.5, or 0.005 to 0.15 weight percent or 0.005 to 0.1 weight percent, or 0.005 to 0.05 weight percent, or 0.005 to 0.01 weight percent. It will be understood that the foregoing weight percentages refer to the amount of the active enzyme, and that in some aspects, the enzymatic crosslinking agent may be provided as an enzymatic composition comprising additional components, such as proteins and polysaccharides. In such cases, the enzymatic composition can be added in an amount effective to provide the enzymatic crosslinking agent (i.e., the active enzyme) in the foregoing amounts. For example, if an enzymatic composition comprises 0.5 weight percent of the active enzyme, based on the weight of the enzymatic composition, and an active enzyme amount of 0.01 weight percent is desired in the mixture with the protein and the polysaccharide, then the enzymatic composition can be added to the mixture in an amount of 2 weight percent, based on the total weight of the mixture, in order to provide an active enzyme concentration of 0.01 weight percent, based on the total weight of the mixture.

One or more additives can optionally be added to the mixture when forming the meat structured protein product. For example, suitable additives can include amino acids and amino acid derivatives (e.g., 1-aminocyclopropane-1-carboxylic acid, 2-aminoisobutyric acid, alanine, arginine, aspartic acid, canavanine, catecholamine, citruline, cysteine, essential amino acids, glutamate, glutamic acid, glutamine, glycine, histidine, homocysteine, hydroxyproline, hypusine, isoleucine, lanthionine, leucine, lysine, lysinoalanine, methionine, mimosine, non-essential amino acids, ornithine, phenylalanine, phenylpropanoids, photoleucine, photomethionine, photoreactive amino acids, proline, pyrrolysine, selenocysteine, serine, threonine, tryptophan, tyrosine, valine), anti-inflammatory agents (e.g., leukotriene antagonists, lipoxins, resolvins), antibiotics (e.g., alamethicin, erythromycin, tetracyclines), antimicrobial agents (e.g., potassium sorbate), antiparasitic agents (e.g., avermectins), buffering agents (e.g., citrate), clotting agents (e.g., thromboxane), coagulants (e.g., fumarate), coenzymes (e.g., coenzyme A, coenzyme C, s-adnosyl-methionine, vitamin derivatives), crosslinking agents (e.g., beta 1,3 glucan transglutaminase, calcium salts, magnesium salts), dairy protein (e.g., casein, whey protein), dietary minerals (e g, ammonium, calcium, fat soluble minerals, gypsum, iron, magnesium, potassium, aluminum), disaccharides (e.g., lactose, maltose, trehalose), edulcorants (e.g., artifical sweeteners, corn sweeteners, sugars), egg protein (e.g., ovalbumin, ovoglobulin, ovomucin, ovomucoid, ovotransferrin, ovovitella, ovovitellin, albumin globulin, vitellin), elasticizing agents (e.g., gluten), emulsifiers (e.g., lecithin, lecithins), enzymes (e.g., hydrolase, oxidoreductase, peroxidase), essential nutrients (e.g., alpha-linolenic acid, gamma-linolenic acid, linoleic acid, calcium, iron, omega-3 fatty acids, zinc), fat soluble compounds, flavones (e.g., apigenin, chrysin, luteolin, flavonols, daemfero, datiscetin, myricetin), glycoproteins, gums (e.g., carob bean gum, guar gum, tragacanth gum, xanthan gum), hemoproteins (e.g., hemoglobin, leghemoglobin, myoglobin), humectants (e.g., polyethylene glycol, propylene glycol, sorbitol, xylitol), isoprenes, isoprenoid pathway compounds (e.g., mevalonic acid, dimethylallyl pyrophosphate, isopentenyl pyrophosphate), isoprenoids or isoprenoid derivatives (e.g., dolichols, polyprenols), liver X receptor (LXR) agonists and antagonists, meat proteins (e.g., collagen), mechanically separated meat, metabolic pathway intermediates (e.g., oxaloacetate, succinyl-CoA), monosaccharides (e.g., fructose, galactose, glucose, lactose, lyxose, maltose, manose, ribose, ribulose, xylulose), neuroactive compounds (e.g., anandamide, cannabinoids, cortisol, endocannabinoids, gammaaminobutyric acid, inositol), neutraceuticals, nucleic acids (e.g., DNA, RNA, rRNA, tRNA), nutritional supplements (e.g., carnitine, fumarate, glucosamine), oil-soluble compounds, organ meat, oxidizing agents (e.g., quinones), partially defatted tissue and blood serum proteins, plasticizing materials, polyols (e.g., alklyne glycols, butanediols, glycerine, glycerol, glycerol, mannitol, propylene glycol, sorbitol, xylitol), polysaccharides (e.g., pectin, maltodextrin, glycogen, inulin), porphyrins, secondary metabolites (e.g., polyketides), secosteroids, spices, steroids (e.g., $C_{18-21}$ steroids, cholesterol, cycloartenol, estradiol, lanosterol, squalene), sterols (e.g., betasitosterol, bras sicasterol, cholesterol, ergosterol, lanosterol, oxysterols, phytosterols, stigmasterol), tannins (e.g., ellagic tannins, ellagic tannins from roasted oak wood, gallic tannins, proanthocyanidin tannins from aromatic grape skin, proanthocyanidin tannins from grape seeds, proanthocyanidin tannins from grape skin, profisetinidin tannins, tannins from green tea leaves, tannins from sangre de drago), terpenes (e.g., diterpenes, monoterpenes, sesquiterpene, squalane, tetraterpenes, triterpenes), thickening agents (e.g., guar gum, pectin, xantham gum, agar, alginic acid and its salts, carboxymethyl cellulose, carrageenan and its salts, gums, modified starches, pectins, processed Eucheuma seaweed, sodium carboxymethyl cellulose, tara gum), vitamins (e.g., alpha-tocopherol, alpha-tocotrienol, beta-tocopherol, beta-tocotrienol, delta-tocopherol, deltatocotrienols, fat soluble vitamins, gamma-tocopherol, gamma-tocotrienol, pantothenic acid, vitamin A, vitamin B-12, vitamin B-12, vitamin C, vitamin D, vitamin E, vitamin E, vitamin K, water soluble vitamins), water-soluble compounds, wax esters, and xenoestrogens (e.g., phytoestrogens).

Further examples include but are not limited to antioxidants, for example, carotenes, ubiquinone, resveratrol, alpha-tocopherol, lutein, zeaxanthin, "2,4-(tris-3',5'-bitertbutyl-4'-hydroxybenzyl)-mesitylene", "2,4,5-trihydroxybutyrophenone", "2,6-di-tert-butyiphenol", "2,6-di-tert-butyl-4-hydroxymethylphenol", "3,4-dihydroxybenzoic acid", 5-methoxy tryptamine, "6-ethoxy 1,2-dihydro-2,2,4-trimethylquinoline", acetyl gallate, alpha-carotene, alpha-hydroxybenzyl phosphinic acid, alphaketoglutarate, anoxomer, ascorbic acid and its salts, ascorbyl palmitate, ascorbyl stearate, benzyl isothiocyanate, beta naphthoflavone, beta-apo-carotenoic acid, beta-carotene, beta-carotene, butylated hydroxyanisole (BHA), butylated hydroxytoluene (BHT), caffeic acid, canthaxantin, carnosol, carvacrol, catalase, catechins, chlorogenic acid, citric acid and its salts, clove extract, coffee bean extract, di-stearyl thiodipropionate, dilauryl thiodipropionate, dodecyl gallate, edetic acid, ellagic acid, erythorbic acid, esculetin, esculin, ethyl gallate, ethyl maltol, ethylenediaminetetraacetic acid (EDTA), eucalyptus extract, eugenol, ferulic acid, flavanones, flavones, flavonoids, flavonoids, flavonols, fraxetin, fumaric acid, gallic acid, gentian extract, gluconic acid, glycine, gum guaiacum, hesperetin, hydroquinone, hydroxycinammic acid, hydroxyglutaric acid, hydroxytryrosol, hydroxyurea, isflavones, lactic acid and its salts, lecithin, lecithin citrate; R-alpha-lipoic acid, lutein, lycopene, malic acid, maltol, methyl gallate, mono isopropyl citrate, monoglyceride citrate, morin, N-acetylcysteine, N-hydroxysuccinic acid, "N,N'diphenyl-p phenylenediamine (DPPD)", natural antioxidantss, nordihydroguaiaretic acid (NDGA), octyl gallate, oxalic acid, p-coumaric acid, palmityl citrate, phenothiazine, phosphates, phosphatidylcholine, phosphoric acid, phytic acid, phytylubichromel, pimento extract, polyphosphates, propyl gallate, quercetin, retinyl palmitate, rice bran extract, rosemary extract, rosmarinic acid, sage extract, sesamol, silymarin, sinapic acid, sodium erythorbate, stearyl citrate, succinic acid, superoxide dismutase (SOD), synthetic antioxidantss, syringic acid, tartaric acid, taurine, tertiary butyl hydroquinone (TBHO), thiodipropionic acid, thymol, tocopherols, tocotrienols, trans resveratrol, trihydroxy butyrophenone, tryptamine, tyramine, tyrosol, ubiquinone, uric acid, vanillic acid, vitamin K and derivates, wheat germ oil, zeaxanthin.

Further examples include but are not limited to coloring agents, for example, FD&C (Food Drug & Cosmetics) Red Nos. 14 (erythrosine), FD&C Red Nos. 17 (allura red), FD&C Red Nos. 3 (carmosine), FD&C Red Nos. 4 (fast red E), FD&C Red Nos. 40 (allura red AC), FD&C Red Nos. 7 (ponceau 4R), FD&C Red Nos. 9 (amaranth), FD&C Yellow Nos. 13 (quinoline yellow), FD&C Yellow Nos. 5 (tartazine), FD&C Yellow Nos. 6 (sunset yellow), artificial colorants, natural colorants, titanium oxide, annatto, anthocyanins, beet juice, beta-APE 8 carotenal, beta-carotene, black currant, burnt sugar, canthaxanthin, caramel, carmine/carminic acid, cochineal extract, curcumin, lutein, mixed carotenoids, monascus, paprika, red cabbage juice, riboflavin, saffron, titanium dioxide, turmeric.

Further examples include but are not limited to flavor enhancers and flavoring agents, for example, 5'-ribonucleotide salts, glutamic acid salts, glycine salts, guanylic acid salts, hydrolyzed proteins, hydrolyzed vegetable proteins, insomniac acid salts, monosodium glutamate, sodium chloride, sea salt, galacto-oligosaccharides, sorbitol, animal meat flavor, animal meat oil, artificial flavoring agents, aspartamine, fumarate, garlic flavor, herb flavor, malate, natural flavoring agents, natural smoke extract, natural smoke solution, onion flavor, shiitake extract, spice extract, spice oil, sugars, yeast extract, fermentation extracts, and seaweed extracts.

When present, any additives can be included in the meat structured protein product in an amount of 0.01 to 5 weight percent, based on the total weight of the meat structured protein.

A plant-based meat structured protein product provided by the method represents another aspect of the present disclosure. The plant-based meat structured protein product comprises fibrous polysaccharide dispersed in a denatured plant protein matrix. The meat structured protein product can comprise 5 to 50 weight percent, or 5 to 40 weight percent, or 5 to 30 weight percent, or 5 to 25 weight percent, or 8 to 15 weight percent, or 9 to 12 weight percent of the denatured plant protein and greater than 0 to 20 weight percent, or 0.1 to 20 weight percent, or 0.1 to 15 weight percent, or 0.1 to 10 weight percent, or greater than 0 to 5 weight percent, or 0.1 to 5 weight percent, or 0.1 to 2 weight percent of the polysaccharide, each based on the total weight of the meat structured protein product. In an aspect, the denatured plant protein can comprise denatured pea protein. In an aspect, the polysaccharide can comprise pectin.

In a specific aspect, a meat structured protein product comprises 5 to 25 weight percent of a denatured pea protein; 0.1 to 5 weight percent of pectin; 0.005 to 0.1 weight percent of enzymatically active transglutaminase; and 69.9 to 94.895 weight percent water, each based on the total weight of the meat structured protein product. In an aspect, the meat structured protein product comprises a seafood analog, for example a scallop analog.

The meat structured protein product can have a water holding capacity of greater than 90%, preferably greater than 92%. The meat structured protein product can be porous and fibrous. The fibrous structures can be as described above. The meat structured protein product can comprise pores having an average pore diameter of 10 to 300 micrometers. Porosity can be analyzed, for example, using scanning electron microscopy. In an advantageous feature, the meat structured protein product can maintain its integrity during cooking. In some applications it is preferable that the surfaces of the structured protein product become brown during cooking.

The meat structured protein products provided herein may have any shape or form. Exemplary shapes include but are not limited to crumbles, strips, slabs, steaks, cutlets, patties, nuggets, loafs, tube-like, noodle-like, chunks, poppers, oblong-shaped pieces, cube-shaped pieces, cylindrical-shaped pieces, and seafood-shaped pieces. In order to obtain the desired shape, the method of forming the meat structured protein product can further comprise transferring the phase-separated mixture to a mold prior to or during crosslinking. Any suitable mold can be used to provide the desired shape.

The meat structured protein products provided herein may be prepared for human or animal consumption. They may be cooked, partially cooked, or frozen either in uncooked, partially cooked, or cooked state. Cooking may include frying either as sautéing or as deep-frying, baking, smoking, impingement cooking, steaming, and combinations thereof. In some embodiments, the meat structured protein products are used in cooked meals, including but not limited to soups, burritos, chilis, sandwiches, lasagnas, pasta sauces, stews, kebabs, pizza toppings, and meat sticks. In some embodiments, the meat structured protein products are mixed with other protein products, including but not limited to other plant-derived products or animal meat.

This disclosure is further illustrated by the following examples, which are non-limiting.

Examples

Materials and Methods

Native pea protein powder was provided by Prof. Jiajia Rao, from North Dakota State University. Pectin from citrus peel (galacturonic acid ≥74.0% dried basis) was purchased from Sigma-Aldrich Co. Ltd (St. Louis, MO). ACTIVA RM transglutaminase (T-gase) preparation was purchased from Ajinomoto North America., Inc. (Chicago, IL, USA). This component contains 0.5% (w/w) of T-gase enzyme (with the remainder being protein and maltodextrin) and is referred to herein as a whole as the "transglutaminase composition". Reference to "transglutaminase" in the following examples refers to the active enzyme only. Raw sea scallops were bought from a local grocery store (Stop & Shop, Amherst, MA) and stored in a freezer (−20° C.) until used. Sodium hydroxide (NaOH) and hydrochloric acid (HCl) were purchased from Fisher Scientific (Waltham, MA). The Bradford reagent used for the protein determination was obtained from the Bio-Rad company (Hercules, CA, USA). For the digestibility studies, fresh North Atlantic scallop (8 oz per piece, 4 pieces per pack) was purchased from Intershell Seafood (Gloucester, MA).

Protein Extraction

Pea protein isolate (PPI) was extracted from yellow pea flour according to a method described previously, with some modifications (Lan, Chen, & Rao, 2018, Food Hydrocolloids, 80, 245-253). Briefly, yellow pea flour (100 g) was dissolved in 1,500 g of deionized water, and the solution was then adjusted to pH 9.0 using 6 N NaOH. The alkaline protein solution was then continuously stirred using a magnetic stirrer at 500 rpm for 1 h at room temperature. The pH was checked every 15 min and adjusted back to 9.0 if necessary. Then, the solution was centrifuged at 5,524×g for 20 min at 4° C. The supernatant was filtered through a Whatman grade 1 (Whatman Grade 42, ashless, 90 mm diameter) using a bench-top vacuum and collected in a flask that was cooled down in an ice bath. The supernatant was then adjusted to pH 4.5 using 6 N HCl followed by centrifugation at 5,524×g for 20 min at 4° C. The pellet from centrifugation was collected and re-suspended in water, and the solution was adjusted back to pH 7.0 using 1 N NaOH. Powdered PPI was obtained by freeze-drying the pellet solution for 48 h.

Extracted Protein Concentration

The concentration of extracted pea protein was determined by the Bradford protein assay (Bradford, 1976, Analytical biochemistry, 72(1-2), 248-254). In brief, a standard curve was prepared using a series of bovine serum albumin (BSA) solutions of different protein concentrations (0 to 1000 μg/mL). For the test samples, 20 w/w % of pea protein stock solution was diluted 1000 times with deionized water. Then, 20 μL of diluted pea protein solution was vortex-mixed with 1 mL of Bradford reagent, incubated for 10 minutes, and the absorbance was measured at 595 nm using UV-visible spectrometer. The protein concentration was then estimated from the standard curve. The test samples were prepared in duplicates and the blank consisted of deionized water. The protein concentration of the stock solution was assessed every time after overnight rehydration.

Differential Scanning Calorimetry Analysis

The thermal transitions of pea proteins dissolved in aqueous solutions were assessed by measuring changes in the heat flow with temperature using a differential scanning calorimeter (DSC 250, TA Instruments, New Castle, DE). Pea protein solutions (20 w/w %) were placed in a high-volume aluminum pan that was then tightly sealed. Another empty high-volume aluminum pan was used as a reference. The weight of each test sample used in the DSC analysis was recorded. DSC measurements were performed by heating the samples from 10 to 130° C. at 3° C./min under an inert atmosphere (400 mL/min of $N_2$). The onset temperature ($T_o$), peak temperature ($T_p$), and enthalpy (ΔH) of the transitions were computed from the thermal curves using the instrument software (TRIOS 5.2). The same samples were then heated again under the same conditions to establish whether the thermal transitions were reversible.

Preparation of Pea Protein-Pectin Gel (Scallop Analog)

Extracted pea proteins were rehydrated overnight to prepare 20 w/w % pea protein stock solutions. These stock solutions were then diluted to 10 w/w %, and the pH was adjusted back to 7.0. Ten grams of pea protein solution were dispensed into a 15 mL beaker (used as a scallop-shaped mold) and then heat-denatured and aggregated by holding at 95° C. for 30 min. This procedure was carried out to increase the effective molecular weight of the proteins, thereby reducing the entropy of mixing effects in the subsequent biopolymer mixtures. After cooling the heat-denatured pea proteins in an ice bath for another 30 min, different concentrations of pectin (0, 0.5 or 1.0 w/w %) were added and the mixtures were stirred at 500 rpm at room temperature for 60 min to ensure dissolution. Then, 2.0 w/w % of transglutaminase composition (T-gase) (corresponding to 0.01 weight percent of the active enzyme) was added to the biopolymer mixtures and the system was stirred for 30 minutes at 500 rpm at room temperature to promote enzyme dissolution. The stir bar was then removed, and the samples were incubated at 50° C. for 30 min to promote protein cross-linking, followed by 30 min of cooling in an ice bath. The gels formed were then gently removed from the beakers and placed onto petri dishes.

Fourier-Transform Infrared Spectroscopy (FTIR) Analysis

FTIR spectra were acquired using a Fourier Transform Infrared spectrophotometer (Shimadzu, Kyoto, Japan) equipped with an attenuated total reflectance (ATR) accessory under ambient conditions. The samples analyzed by the ATR-FTIR instrument were prepared according to a method described previously (Liu et al., 2009). Briefly, powdered pea protein, pectin, or pea protein-pectin (scallop analog) were placed between two pieces of aluminum foil and then pressed into a small pellet. This pellet was then further pressed onto the germanium crystal surface using an ATR accessory to ensure good contact with the ATR crystal. The background signal was collected before each measurement. Each spectrum was the average of 32 scans in the wavenumber range from 4000 to 400 $cm^{-1}$ at a 4 $cm^{-1}$ resolution.

Texture Profile Analysis

A texture analyzer (TA.XT2, Stable Micro System, Surrey, England) with a flat-ended cylinder probe (25 mm diameter) was used to characterize the mechanical properties of the scallop and scallop analog. Double compression was applied to all the samples and the texture profile analysis (TPA) parameters were calculated from the resulting stress-strain curves based on the methods described in a previous study (Zhang, Pham, Tan, Zhou, & McClements, 2021b). In brief, a cylindrical test sample of fixed dimensions (4 cm diameter×0.8 cm height) was placed on the instrument lower plate and the measurement probe was moved downward at a pre-speed of 2 mm/s. When the probe first touched the surface of the test samples, their thickness was automatically recorded. The probe continued to press the samples to a final strain of 50% at a test speed of 2 mm/s. Then, the samples were allowed to recover for 15 s by removing the force of the probe that was applied on their surfaces. After that, the probe was then pressed onto the samples again, which resulted in a double compression, and then returned to its original position at a post-test speed of 2 mm/s. The trigger force was set to 0.049 N (5 g). The following parameters were then calculated from the texture analysis (TPA) profiles of each sample (Zhang et al., 2021b):

Hardness: The hardness is a measure of the resistance of the sample to compression, which was taken to be the maximum force reached during the first compression of the sample ($F_{max1}$).

Cohesion: The cohesion is a measure of how well the sample maintains its textural attributes after the first deformation, which was calculated as the ratio of areas under the curves for the second and first peaks in the TPA profile ($A_2/A_1$).

Springiness: The springiness is a measure of how well the sample springs back to its original dimensions after it has been deformed using a first compression, allowed to sit for 15 s, and then deformed again using a second compression.

It is calculated as the ratio of the distances from the start of compression until the maximum is reached for peak 2 and peak 1 ($D_2/D_1$).

Chewiness: The chewiness is a measure of the energy required to chew solid foods, which is calculated as Hardness x Cohesiveness x Springiness.

Scanning Electron Microscope Analysis

Both scallop and scallop analog were freeze-dried (Genesis Pilot Lyophilizer, SP Scientific, Stone Ridge, NY, USA) and then sputter-coated with gold (Zhang et al., 2016). All samples were examined by scanning electron microscopy (SEM) using a FEI Magellan 400 (FBI, OR) with an accelerating voltage of 5 kV under low vacuum conditions.

Water Holding Capacity

The water holding capacity of both scallops and scallop analogs were analyzed using a centrifugal method. A fixed amount (0.50 g) of each initial test sample was placed into a centrifuge tube and then centrifuged at 10,000 rpm at room temperature for 15 minutes. Any water released from the test samples was carefully removed using a pipette and their final weight was measured. The water holding capacity was calculated as follows:

$$WHC(\%) = \frac{\text{Initial Weight [g]}}{\text{Final Weight [g]}} \times 100$$

Colorimetric Analysis

The tristimulus color coordinates (L*, a*, b*) of the real scallop and scallop analog were measured using a colorimeter (ColorFlez EZ, HunterLab, Reston, VA). The L* value describes lightness, the a* value describes redness/greenness, and the b* value describes blueness/yellowness (Commission Internationale de l'Eclairage, Vienna, Austria).

Cookability

The impact of pan frying on the structural and physicochemical properties of the real scallop and scallop analog was also tested. The samples were placed in a non-stick frying pan and heated on each side for 3 min, leading to a total cooking time of 6 min. The internal temperature was monitored with a 0.1 mm diameter copper-constantan thermocouple (Type-T). After cooking, the microstructure, texture and color of the scallop and scallop analog were measured.

Statistical Analysis

Triplicate analyses were performed for all measurements. Statistical analysis was conducted using Microsoft Excel 2019 software to determine P values using a student's t test. Significant differences (P<0.05) between different group means were determined with the Tukey-Kramer HSD test.

Characterization of Extracted Pea Proteins

The molecular state of the extracted pea proteins (native or denatured) was determined using differential scanning calorimetry (DSC). The heat flow versus temperature profiles of pea protein solutions (20% w/w %) were measured when they were heated from 10 to 120° C. at a heating rare of 3° C./min (FIG. 1). The same sample was then cooled and heated again under the same conditions to establish whether any observed thermal transitions were reversible or irreversible. During the first scan, a major peak was observed at a temperature ($T_{peak}$) around 85° C., which was associated with an endothermic enthalpy change (ΔH) of around 1.02 J/g. This endothermic peak was attributed to the thermal denaturation of the globulin fraction of the pea protein. Similar thermal denaturation temperatures have been reported for globulin pea proteins in other studies, e.g., 88°

C. (Osen, Toelstede, Wild, Eisner, & Schweiggert-Weisz, 2014) and 86° C. (Arntfield & Murray, 1981). Some researchers have reported two endothermic peaks for pea protein isolates during heating: one corresponding to the denaturation of the non-globulin fraction (around 67° C.) and another corresponding to the denaturation of the globulin fraction (around 85° C.) (Shand, Ya, Pietrasik, & Wanasundara, 2007). During the second scan of the pea protein solution, it was observed that the peak associated with the thermal denaturation of the proteins was greatly diminished (FIG. 1), which suggested that most of the protein molecules had been irreversibly denatured during the first scan.

Preparation of Scallop Analogs

Figure 2:
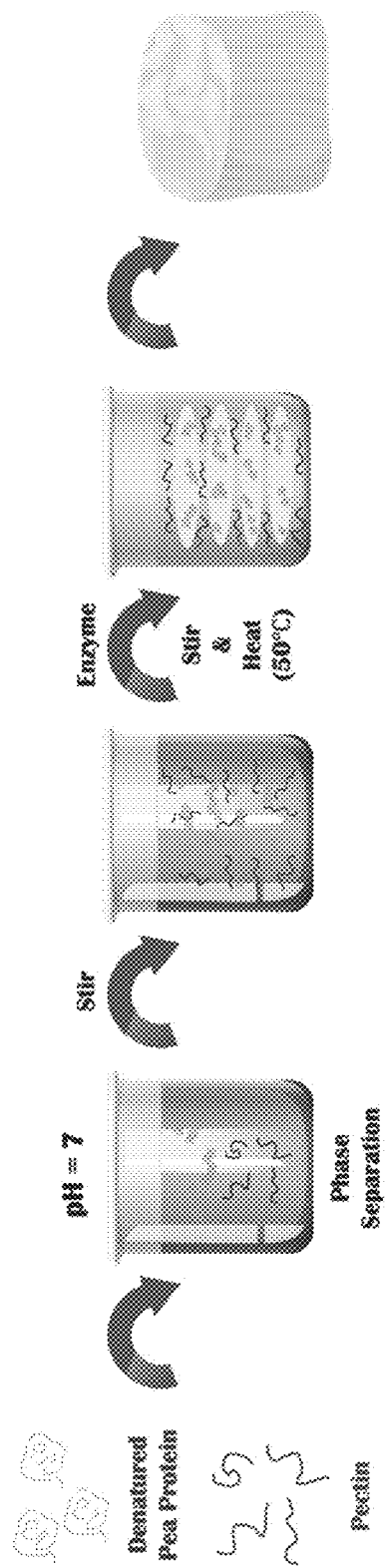
FIG. 2 is a schematic overview of the process used for formation of scallop analogs.

The series of steps used to prepare the plant-based scallops is shown schematically in FIG. 2. Each major step in the process is described here with a discussion of the underlying physicochemical principles.

First, a solution of native pea proteins was heated (95° C., 30 min) above its thermal denaturation temperature to promote the unfolding and aggregation of the protein molecules. This increases the effective molecular weight of the proteins, thereby reducing the entropy of mixing effect that opposes phase separation. This step is carried out under appropriate protein concentration, pH, and ionic strength conditions to ensure that the protein aggregates formed have appropriate dimensions. It was found that heating a 10% (w/w) protein solution at neutral pH in the absence of salt was sufficient to achieve this goal. After formation, the solution of heat-denatured proteins was cooled to room temperature. The resulting solution was more viscous than the original solution but did not gel, which suggests that protein aggregates had been formed but they were not so large that they formed a network that occupied the entirety of the system.

Pectin was added to the heat-denatured protein solution at room temperature and the system was mixed. A pea protein concentration of 10% was used to mimic the protein concentration found in real scallop (10 to 12%). Several pectin concentrations (0, 0.5, and 1.0%) were used to assess the impact of polysaccharide addition on the microstructure and textural attributes of the scallop analogs. At sufficiently high biopolymer concentrations, phase separation of mixed protein-polysaccharide systems occurs under similar biopolymer concentrations due to a phenomenon known as thermodynamic incompatibility (Doublier, Garnier, Renard, & Sanchez, 2000; Tolstoguzov, 2006; Wolf & Frith, 2003).

When a phase separated mixed biopolymer system is gently stirred it forms a water-in-water (w/w) emulsion, in which the disperse phase droplets are enriched in one kind of biopolymer and the continuous phase is enriched in the other kind of biopolymer. Typically, the interfacial tension at the water-water interface is relatively low (e.g., $10^{-7}$ to $10^{-5}$ N/m), which means that the droplets are easily deformed and elongated by applying relatively mild shear forces (Dekkers et al., 2018). This phenomenon has previously been used to create fibrous structures from soy protein/pectin mixtures by shearing them at high temperatures in a specialized shear cell device (Dekkers et al., 2018; Dekkers et al., 2016). The biopolymer composite material formed consisted of pectin filaments embedded within a protein matrix. We therefore postulated that fiber-like structures would also be formed in the pea protein/pectin blends used in the present study when the biopolymer mixture was sheared.

Once the fiber-like structures were formed in the biopolymer mixture, they were locked into place by gelling the proteins using 2% transglutaminase composition (corresponding to 0.01 weight percent of the active enzyme). This food-grade enzyme induces protein crosslinking by catalyzing an acyl-transfer reaction between a γ-carbonyl group of a glutamine residue and an ε-amino group of a lysine residue (Herz, Schafer, Terjung, Gibis, & Weiss, 2021; Yuan et al., 2014). It should be noted that microbial transglutaminase is widely used in the food industry as a crosslinking agent due to its relatively low cost and "Generally Recognized As Safe" labeling status (Motoki & Seguro, 1998; Yuan et al., 2014).

The scallop analogs formed by this process were removed from the glass beakers. These beakers were selected because they had similar dimensions to real scallops (e.g., 2-3 centimeters in diameter and 1 centimeter in height) and could therefore be used as molds. Alternatively, molds with specific seafood-like shapes and sizes could be used to form other kinds of seafood.

FTIR Analysis

Figure 3:
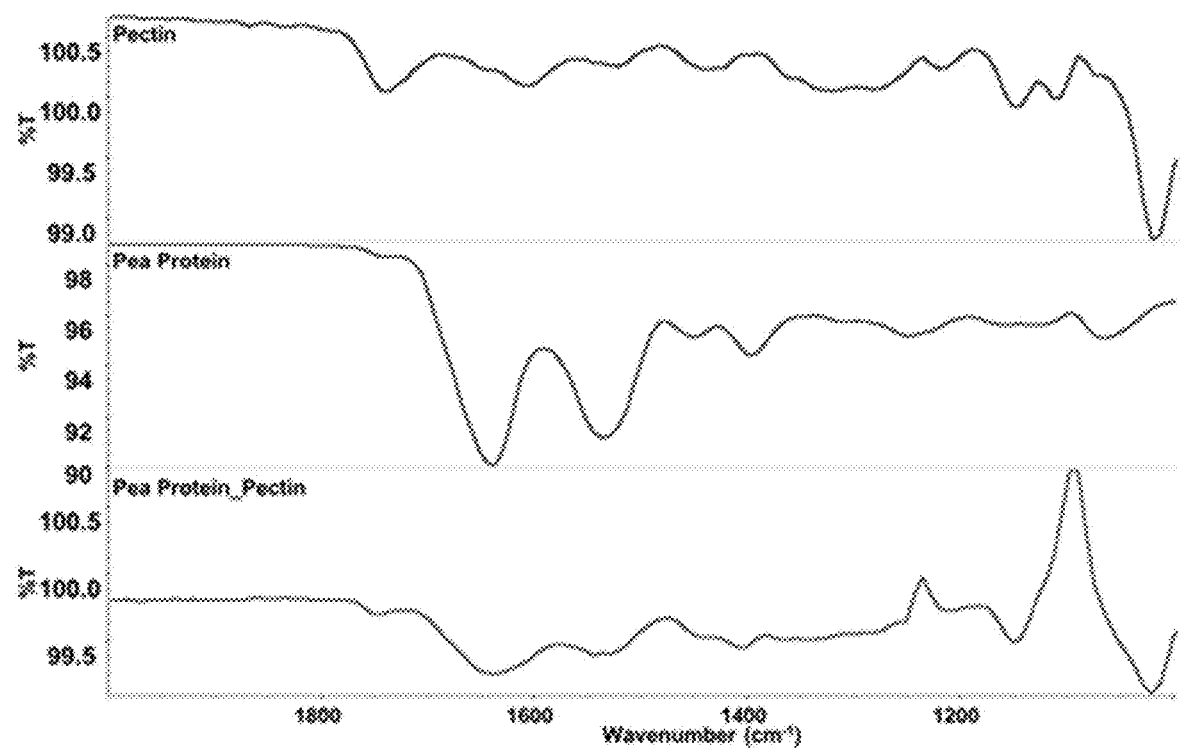
FIG. 3 shows percent transmission (% T) versus wavenumber ($cm^{-1}$) for pectin (top), pea protein (middle), and pea protein/pectin scallop analogs (bottom) obtained using Fourier Transform Infrared (FTIR) spectroscopy.

FTIR spectroscopy was used to provide information about the composition of the scallop analogs. As shown in FIG. 3, bands were observed at wavenumbers of 1633, 1529, and 1389 $cm^{-1}$, which were consistent with the C=O, N—H, and C—N stretching/bending vibrations in amide I, II and III, respectively. These bands were seen in both the pure pea protein and in the scallop analogs, which confirmed that the proteins were present within the scallop analogs. The strong band observed at 1012 $cm^{-1}$ can be assigned to intermolecular hydrogen bonding of the pectin backbone. This band was seen in both the pure pectin and the scallop analogs, which confirmed that the pectin was also present within the scallop analogs. Some new peaks were observed in the spectra of the scallop, which may have been due to the presence of water or due to changes in the molecular interactions in the system when the protein and polysaccharide molecules were mixed.

Textural and Water Holding Properties of Scallop and Scallop Analogs

Texture profile analysis was used to provide information about the impact of product formulation on the textural attributes of the plant-based scallops, as well as to compare their textural attributes to those of real scallops.

Figure 4:
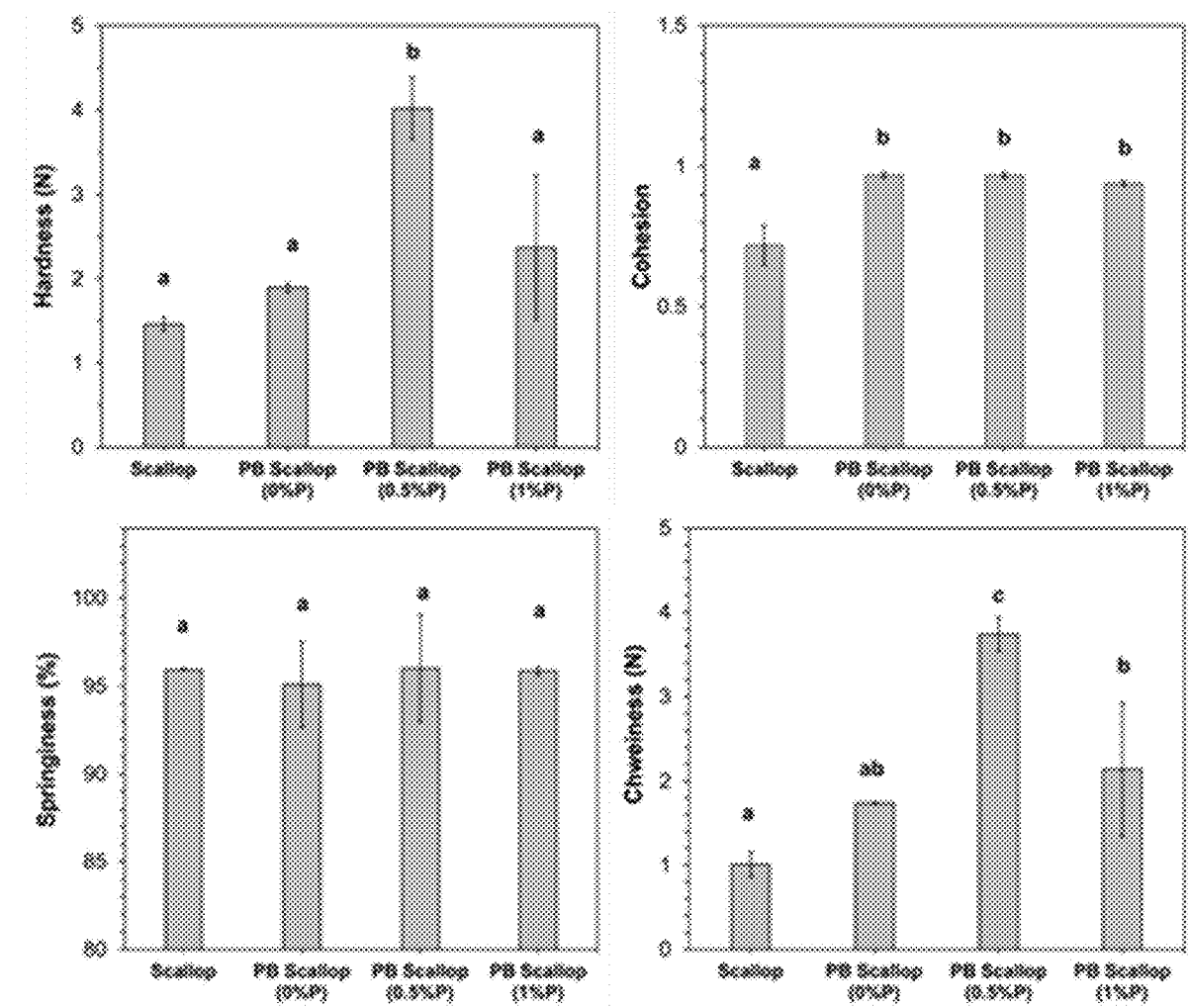
FIG. 4 shows the textural profile analysis of scallop and scallop analogs containing different pectin concentrations. All scallop analogs contained 10% pea protein and 0.01% active transglutaminase.

As shown in FIG. 4, the hardness, springiness, and chewiness of the scallop analog constructed from 10% pea protein and 2% transglutaminase composition (e.g., 0.01 weight percent of the active enzyme) were not statistically different from those of real scallop. However, the cohesion of these scallop analogs was significantly higher than that of the real scallops. The hardness and chewiness of the scallop analogs increased when the pectin concentration was raised from 0 to 0.5% (w/w) but then decreased when it was further raised to 1.0% (w/w). These results suggest that low concentrations of pectin strengthened the texture of the uncooked scallop analogs, while high concentrations weakened it. Without wishing to be bound by theory, it is believed that that low pectin concentrations may promote phase separation of the protein-polysaccharide mixture, which increases the protein concentration in the continuous phase, thereby strengthening the gel matrix. Conversely, high pectin concentrations may inhibit the molecular interactions between neighboring protein molecules. The springiness of the scallops and scallop analogs was relatively high (>95%) and did not depend on the pectin concentration used (FIG. 4). This latter effect suggests that the incorporation of the pectin did not affect the ability of the scallop analogs to return to almost their original dimensions after the first compression.

Figure 5:
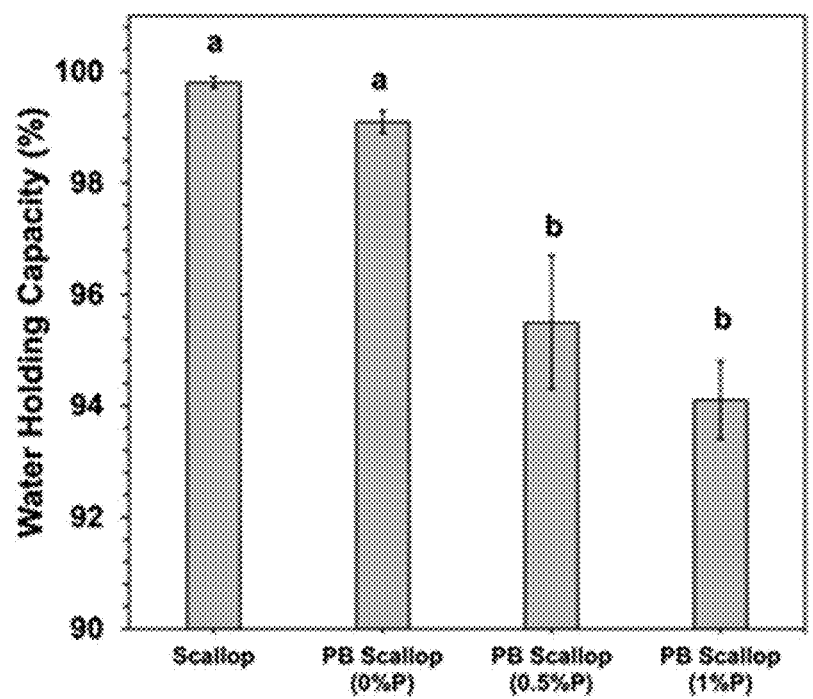
FIG. 5 shows the water holding capacity of scallops and scallop analogs containing different pectin concentrations. All scallop analogs contained 10% pea protein and 0.01% active transglutaminase.

The water holding capacity (WHC) of the scallop and scallop analogs was also measured (FIG. 5). The WHC of the scallop and scallop analog containing no pectin were quite similar, with no significant difference between them. The WHC of the scallop analogs decreased significantly with increasing pectin concentration, going from around 99.1% at 0% pectin to 94.1% at 1.0% pectin. In general, the WHC is a measure of the ability of a material to retain water when an external stress is applied, such as centrifugation. The ability of porous food matrices to retain water can be attributed to the presence of a 3D network of entangled and crosslinked biopolymer molecules. Three main physicochemical processes typically contribute to the water holding properties of porous food matrices: (i) biopolymer-water mixing effects; (ii) ion distribution effects; and (iii) elastic deformation effects (Cornet et al., 2021a; van der Sman, Paudel, Voda, & Khalloufi, 2013). The biopolymer-water mixing effect depends on changes in the molecular interactions and entropy of the biopolymer and water molecules when they are combined. Consequently, it is governed by the type of molecular interactions (e.g., electrostatic, hydrogen bonding, and/or hydrophobic interactions) and contact area between the biopolymer and water molecules (which depends on the pore size of the biopolymer network). The ion distribution effect is mainly a result of concentration gradients between mineral ions inside and outside the biopolymer network, as this generates an osmotic pressure. These effects are therefore impacted by the tendency for counter-ions to accumulate around oppositely charged groups on the surfaces of biopolymer molecules in the gel network. The elastic deformation effect results from the mechanical resistance of the biopolymer network to compression when an external force (such as centrifugation) is applied: the stronger the gel network, the greater the WHC.

The observed decrease in WHC with increasing pectin concentration therefore suggests that the presence of the polysaccharide impacted one or more of these physicochemical mechanisms. The TPA measurements showed that the addition of pectin increased the hardness of the scallop analogs (FIG. 3), which suggests that elastic deformation effects were not responsible for the reduction in WHC. The presence of the pectin molecules increased the pore size of the biopolymer network (as will be shown later), which would have decreased the contact area between the protein molecules and water, thereby reducing the ability of the scallop analogs to retain water. The presence of the pectin may also have altered the balance of mineral ions inside and outside the gels, which would have altered the magnitude of the osmotic stress acting on the gels, thereby altering their WHC. Nevertheless, further research is needed to identify the precise physicochemical origin of these effects.

Microstructure

Figure 6:
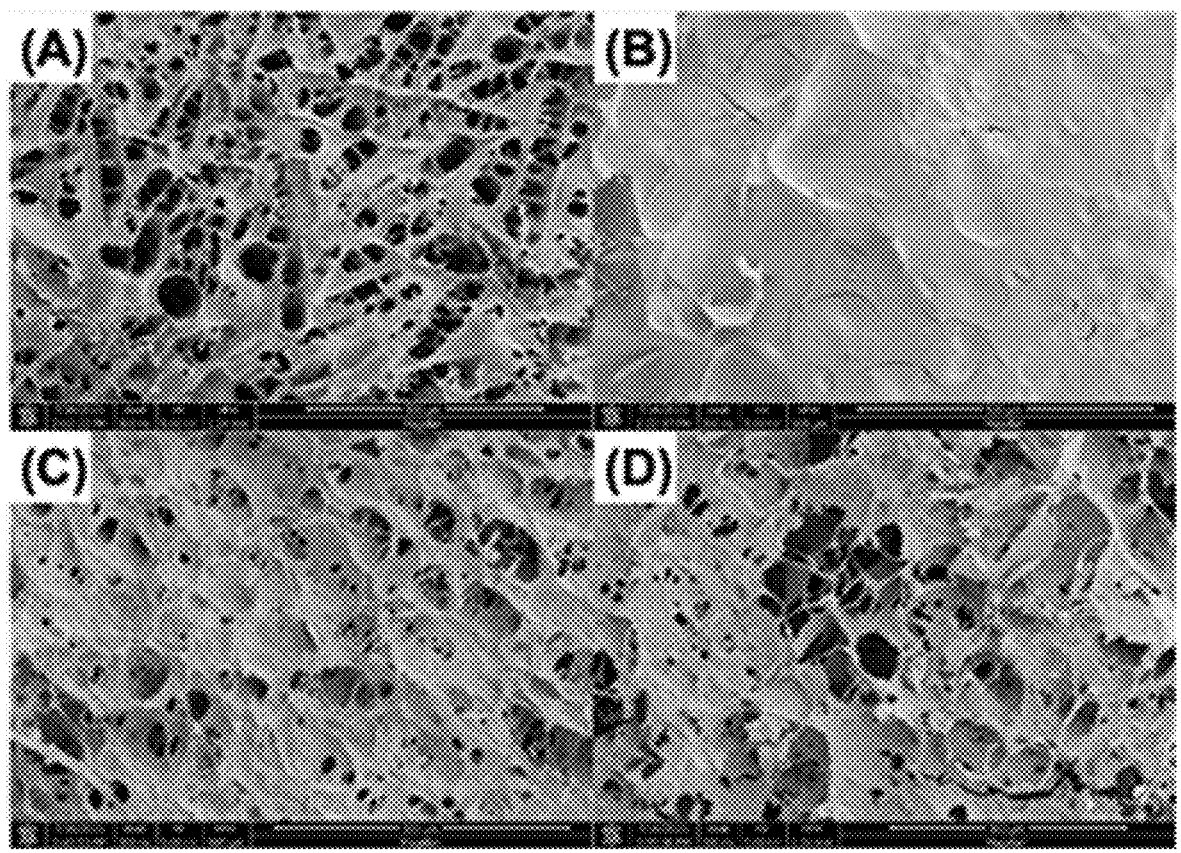
FIG. 6 shows scanning electron microscopy images of scallop (A) and scallop analogs containing 0% (B), 0.5% (C) and 1.0% (D) pectin. All scallop analogs contained 10% pea protein and 0.01% active transglutaminase.

Scanning electron microscopy was used to provide insight into the microstructure of the scallops and scallop analogs (FIG. 6(A)). The real scallop had a honeycomb structure, which is consistent with that reported previously for scallop adductor muscles (Perez-Won, Tabilo-Munizaga, & Barbosa-Cánovas, 2005). Presumably, this structure was due to the presence of the muscle fibers in the scallop. During the dehydration process required to prepare the samples for SEM analysis, the fibers in the scallops may have separated from each other. In the absence of pectin, the scallop analogs had a much smoother microstructure than the real scallop (FIG. 6(B)), which may have been because they only contained a network of closely packed globular pea protein molecules. As the pectin concentration was raised, the biopolymer network became more porous, and the pore size increased (FIG. 6(B) to 6(D)). This effect may be due to the ability of the pectin molecules to promote phase separation of the pea protein-pectin mixtures, thereby leading to the formation of fiber-like structures when they were sheared during the formation of the scallop analogs. The increase in pore size with increasing pectin concentration would account for the reduction in WHC when the pectin concentration was raised, as discussed previously. Overall, these results show that the microstructure of the scallop analogs is closer to that of the real scallops when pectin is incorporated into the system.

Color and Textural Properties of Scallop and Scallop Analog After Grilling

In these experiments, the color and textural attributes of scallop analogs were compared to those of real scallops after grilling. Scallop analogs containing 10% pea protein, 0.5% pectin, and 2% transglutaminase composition (e.g., 0.01 weight percent of the active enzyme) were selected for these studies because they had microstructures similar to real scallops. Moreover, the changes in physicochemical properties caused by grilling led to final products with textural attributes more like those of real scallops.

Figure 7:
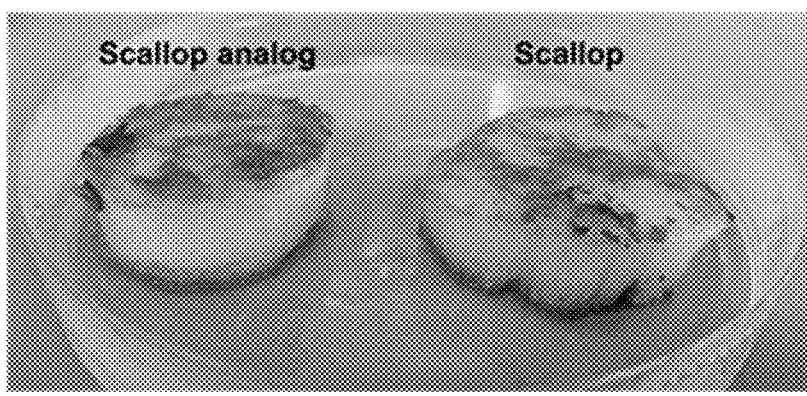
FIG. 7 shows an image of a scallop (left) and a scallop analog (right) after grilling for three minutes on each side. The scallop analogs contained 10% pea protein, 0.5% pectin, and 0.01% active transglutaminase.

The surfaces of the real scallop turned golden brown after grilling for 3 min on each side (FIG. 7). This color change can be attributed to the Maillard reaction, which is a complex series of non-enzymatic reactions between the E-amino groups of proteins and the carbonyl groups of reducing sugars. The Maillard reaction is known to occur when seafood such as fish, shellfish, shrimp, and squid are thermally processed, resulting in desirable flavors and colors during cooking. Similar to real scallop, the surfaces of the plant-based scallop also became golden brown after grilling (FIG. 7), which can be attributed to a Maillard reaction between the pea protein and pectin (Tamnak, Mirhosseini, Tan, Ghazali, & Muhammad, 2016).

Further information about the appearance of the grilled scallops was obtained by colorimetric analysis (Table 1). As shown in Table 1, there were no significant differences between the lightness (L* value), redness (a* value), and yellowness (b* value) of the real scallops and the scallop analogs. Both types of products had intermediate lightness values (53-55), moderate redness values (24-26), and low yellowness values (0.8 to 0.9). These results suggest that the appearance of real scallops could be closely matched using the plant-based scallop analogs developed in this study.

TABLE 1

| Sample | L* | a* | b* |
|---|---|---|---|
| Scallop | 52.5 ± 0.9 | 6.2 ± 0.8 | 26.3 ± 0.4 |
| Scallop Analog | 54.9 ± 2.2 | 6.5 ± 0.9 | 24.0 ± 2.0 |

The textural attributes of the real scallops and scallop analogs were also measured and compared after grilling. Compared to the uncooked versions, there was a large increase in the hardness and chewiness of both types of scallops after grilling. For instance, the hardness increased from 1.46 to 19.6 N for the real scallop and from 4.02 to 16.9 N for the plant-based scallop after grilling, while the chewiness increased from 1.01 to 15.4 for the real scallops and from 3.74 to 13.0 for the scallop analogs. For the real scallops, this effect can be attributed to unfolding and crosslinking of the protein molecules, as well as to moisture loss caused by the high temperature used during grilled, which increased the protein concentration and therefore the gel strength. For the plant-based scallops, the pea proteins were already thermally denatured prior to grilling but the gel strength may still have increased due to the increase in protein concentration due to heat-induced moisture loss, as well as an increase in protein crosslinking caused by cooking. Interestingly, the relative increases in hardness and chewiness after grilling were greater for the real scallop (13- and 15-fold, respectively) than for the scallop analog (4.2- and 3.5-fold, respectively). This was one of the main reasons that 0.5% pectin was included within the scallop analogs (even though it led to harder gels before cooking). There was an increase in the cohesion of the real scallop after grilling (from 0.72 to 0.82) but a decrease for the scallop analogs (from 0.97 to 0.82), which suggests that cooking had different effects on their abilities to retain their shape after compression. Both the real scallop (96.4%) and scallop analog (93.6%) retained their high degree of springiness after grilling.

A direct comparison of the hardness, cohesion, springiness, and chewiness of the grilled real scallop and scallop analog showed they were not statistically different (FIG. 8), which suggests their textural properties were similar.

The behavior of plant-based seafood analogs within the human gastrointestinal tract is important because it influences their nutritional profile and health effects. The present inventors used a simulated gastrointestinal tract (GIT) model to monitor the behavior of plant-based scallop analogs in the mouth and stomach.

Preparation of Pea Protein-Pectin Gel (Scallop Analog) for Digestibility Study

Extracted pea proteins were rehydrated overnight to prepare 20 w/w % pea protein stock solutions. These stock solutions were then diluted to 10 w/w % protein, and the pH was adjusted back to 7.0. Ten grams of pea protein solution were dispensed into a 15 mL beaker (used as a scallop-shaped mold) and then heat-denatured and aggregated by holding at 95° C. for 30 min. This procedure was carried out to increase the effective molecular weight of the proteins, thereby reducing the entropy of mixing effects in the subsequent biopolymer mixtures. After cooling the heat-denatured pea proteins in an ice bath for another 30 min, 0.5 w/w % pectin was added, and the mixtures were stirred at 500 rpm at room temperature for 60 min to ensure dissolution. Then, 0.5 w/w % flaxseed oils were spiked into the above solution and coarse oil-in-water emulsions were prepared by blending this mixed solution using a high-shear mixer for 2 minutes. After that, 2.0 w/w % of transglutaminase (T-gase) was added to the biopolymer mixtures and the system was stirred for 30 minutes at 500 rpm at room temperature to promote enzyme dissolution. The stir bar was then removed, and the samples were incubated at 50° C. for 30 min to promote protein crosslinking, followed by 30 min of cooling in an ice bath. The gels formed were then gently removed from the beakers and placed onto petri dishes.

The nutrients of the purchased Fresh North Atlantic scallop and the scallop analog according to the present disclosure are compared in Table 2.

TABLE 2

| Nutrition values (per 100 g) | Scallop | Plant-based Scallop |
| --- | --- | --- |
| Total Fat (g) | 0.6 | 0.5 |
| Protein (g) | 14.8 | 10 |
| Total Carbohydrate (g) | 4 | 0.5 |

In Vitro Digestion

The in vitro digestion protocol used in this study was based on the INFOGEST digestion method (Brodkorb, et al., 2019, Nature Protocols, 14(4), 991-1014). As suggested, 1.25× electrolyte stock solutions were prepared for each digestion phase and the enzyme activities were measured before the experiments. The $NaHCO_3$ in all stock solutions was replaced with NaCl to avoid potential pH changes during storage and digestion in an open beaker. Before digestion, the scallop samples were fully cooked. Samples and stock solutions were preheated to 37° C. and all digestion processes were carried out at 37° C.

Oral phase: In the oral phase, 25 mL of simulated oral fluids were added to a beaker containing 25 g of cooked North Atlantic scallop or plant-based scallop, and then the resulting mixtures were stirred for 2 mins to mimic the agitation foods experience within the human mouth. In the final oral mixture, the mucin concentration was 1.5 mg/mL, and the amylase activity was 75 U/mL.

Stomach phase: Simulated gastric fluids were added to the sample from the oral phase to reach a final volume ratio of 1:1, and then the mixture was rapidly adjusted to pH 3.0. In the final stomach mixture, the pepsin activity was 2000 U/mL. Gastric lipase was omitted in this phase so that we could focus on protein hydrolysis within the stomach phase. The digestion of the proteins in the stomach was monitored using an automatic titration unit (Metrohm, USA Inc, Riverview, FL) to maintain the sample at pH 3.0 for 2 h by titrating in HCl solution (0.05 M).

Small Intestine phase: 20 mL of simulated intestinal fluids were added to the sample from the stomach phase and then the resulting mixture was adjusted to pH 7.0. In the final stomach mixture, the concentration of bile salts was 10 mM, the trypsin activity was 100 U/mL, and the lipase activity was 2000 U/mL. The mixture was stirred in the water bath throughout 2 h to mimic intestinal conditions.

Protein Hydrolysis

The degree of hydrolysis (DH) of the proteins in the stomach phase was calculated from the results of the pH-stat method as described previously (Diermayr & Dehne, 1990, Zeitschrift Fur Lebensmittel-Untersuchung Und-Forschung, 190(6), 516-520; Yasumaru & Lemos, 2014, Aquaculture, 426-427(426-427), 74-84). These calculations were based on the following equation:

$$DH = \frac{V_{HCl} \times C_{HCl}}{M_{protein} \times P} \times F_{PH} \times 100\%$$

Here, VHCl is the volume of HCl recorded by pH stat in the gastric phase, CHCl is the concentration of the HCl solution (0.25 M) used, Mprotein is the mass of protein present, P is the number of peptide bonds cleaved per unit amount of protein (mol/g protein), which was 8.41, and FpH is a constant taken to be 1.8 under the conditions used (pH=3.0 and 37° C.).

Characterization of Physicochemical Properties

Particle dimension and surface charge: The mean particle diameters and size distribution of samples after mouth, stomach, and small intestine phases were measured using laser diffraction (Mastersizer 2000, Malvern Instruments, Worcestershire, UK). The volume-weighted ($d_{43}$) were calculated from the particle size distributions. The surface charge (ζ-potential) of the digested samples were measured using a particle electrophoresis instrument (Nano-ZS, Malvern Instruments). The electrolyte solutions of corresponding phase (mouth, stomach and small intestinal) were used to dilute samples to a suitable concentration before the measurements were carried out.

Microstructure: The microstructures of the lipid and protein particles in the North Atlantic Scallop and plant-based scallop samples after each digestion phase were observed using confocal fluorescence microscopy (Nikon D-Eclipse C1 80i, Nikon, NY). Firstly, 20 µL of fat-soluble stain (Nile Red) and protein-soluble stain were added to 300 µL samples, respectively. Then a droplet of stained sample was placed on a slide and observed using a 40× objective lens.

Figure 8:
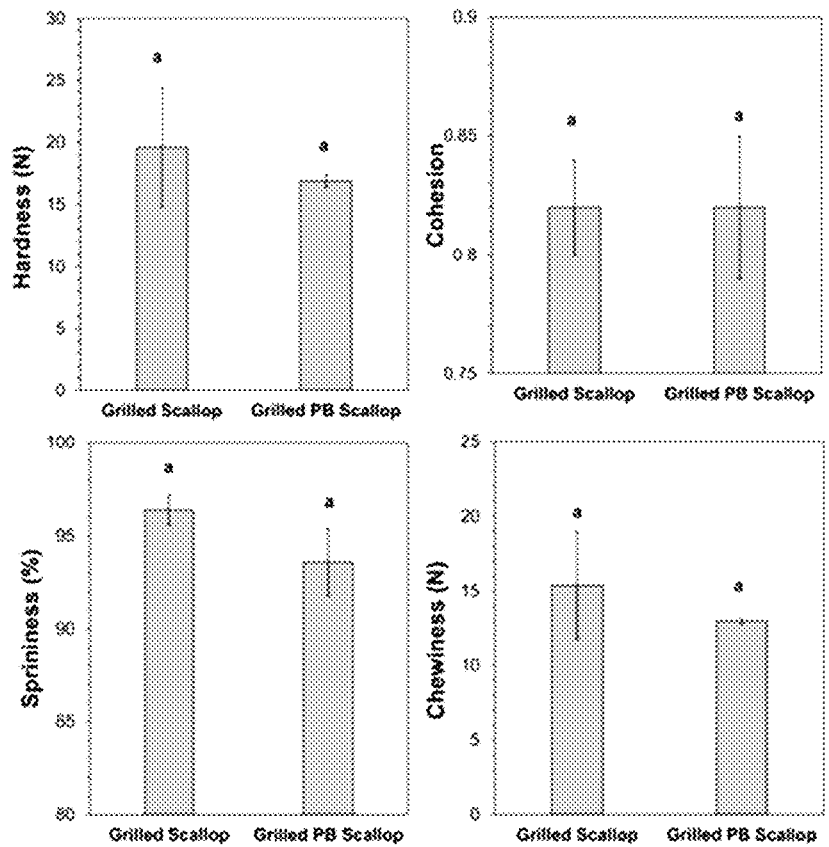
FIG. 8 shows textural profile analysis of scallop and scallop analog. The scallop analogs contained 10% pea protein, 0.5% pectin, and 0.01% active transglutaminase.
Figure 9:
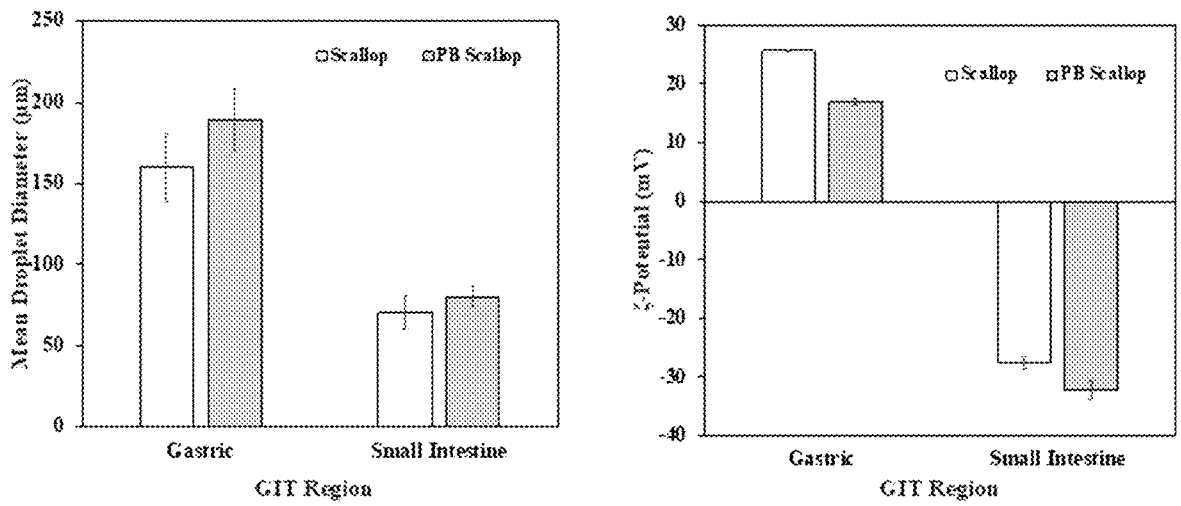
FIG. 9 shows the particle size and zeta-potential of plant-based scallops after being subjected to simulated gastric and small intestine conditions.

The particle size and zeta-potential of the scallop samples were measured after they were subjected to simulated gastric and small intestine conditions. The results are shown in FIG. 8. For both the real and plant-based scallops, the particle size was relatively large in the gastric phase and smaller in the small intestine phase, which may be due to their partial degradation by enzymes, acids, and/or mechanical forces. Moreover, both real and plant-based scallops had a positive charge in the simulated gastric phase but a negative charge in the small intestine phase. This effect can be attributed to the fact that the pH of the gastric fluids (pH 3) was below that of the isoelectric point of the proteins (pI around 5), whereas the pH of the small intestinal fluids (pH 7) was above the isoelectric point of the proteins.

Figure 10:
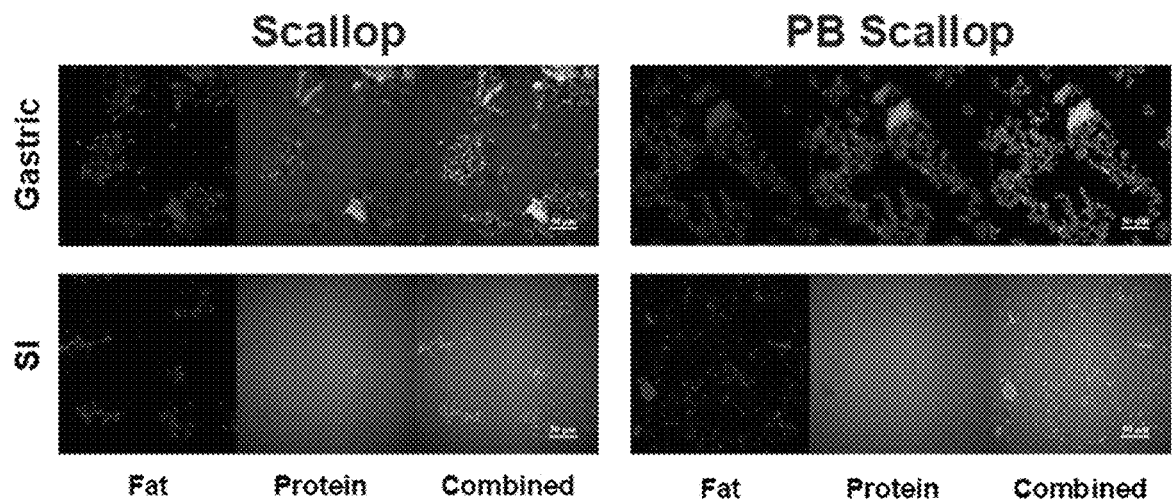
FIG. 10 shows confocal fluorescence microscopy images of plant-based and real scallops under simulated GIT conditions. Scale bar=50 μm.

Confocal fluorescence microscopy of the plant-based and real scallops showed that there were some differences and similarities in their behaviors under simulated GIT conditions, as shown in FIG. 10. In the gastric phase, there were relatively large clumps of material consisting of both protein and lipids for both the real and plant-based scallops. However, the structural organization of these clumps was somewhat different. In the small intestine, the majority of these clumps had been broken down, which can be attributed to the impact of proteases and lipases in the small intestinal fluids that hydrolyzed the proteins and lipids. Again, the behavior of the real and plant-based scallops was quite similar.

Figure 11:
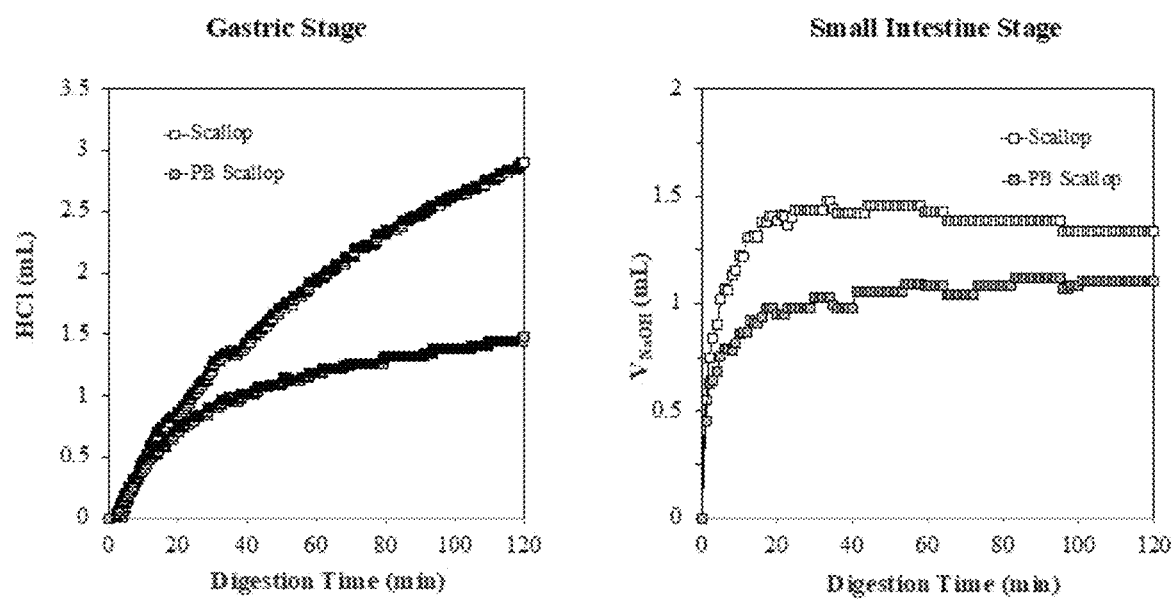
FIG. 11 illustrates the digestion of plant-based and real scallops measured under simulated gastric and small intestine conditions using a pH stat method.

Finally, the digestion of the plant-based and real scallops was measured in the simulated gastric and small intestine phases using a pH stat method. In the gastric phase, the volume of HCl required to maintain the system at pH 3.0 was measured, while in the small intestine phase, the volume of NaOH required to maintain the system at pH 7.0 was measured. In the gastric phase, the change in HCl volume with time provides a measure of protein digestion, whereas in the small intestine phase the change in NaOH volume with time provides a measure of both protein and lipid digestion. These results, shown in FIG. 11, show that the real scallop had a greater digestibility than the plant-based scallop in both the simulated stomach and small intestine regions. The percent hydrolysis of the proteins in the real and plant-based scallop samples by the end of the gastric phase calculated using the equation given earlier were around 38 and 19%, respectively.

Overall, these experiments show that the plant-based scallops are broken down under simulated gastrointestinal conditions and behave somewhat similarly to real scallop. Both real and plant-based scallop are largely broken down by the time they reach the end of the small intestine, which can be attributed to digestion of the proteins and lipids by proteases and lipases.

In summary, the present inventors have shown that a soft matter physics approach can be used to produce scallop analogs based on thermal denaturation, phase separation, shearing, and enzymatic gelling of plant protein/polysaccharide mixtures under controlled conditions. Unlike conventional extrusion or shear-cell technologies, no specialized equipment (e.g., an extruder or pressurized high shear cell) is required to create the seafood analogs. The microstructure and physical properties of the scallop analogs could be controlled by adding different pectin concentrations. The gel strength increased upon the addition of a relatively low pectin concentration (0.5%, w/w) but decreased upon the addition of a higher concentration (1.0%, w/w). After grilling, the appearance and textural properties of the scallop analogs were very similar to that of the real scallop. The findings presented herein suggest that the method developed in this study may be a simple and affordable means of producing plant-based seafood analogs.

This disclosure further encompasses the following aspects.

Aspect 1: A method of making a meat structured protein product, the method comprising: combining a denatured plant protein and a polysaccharide in the presence of an aqueous solvent to provide a phase-separated mixture comprising a dispersed phase comprising the polysaccharide; and a continuous phase comprising the denatured plant protein; forming fibrous structures comprising the polysaccharide in a protein matrix comprising the plant protein at a temperature of less than 100° C.; and crosslinking the protein matrix to provide the meat structured protein product.

Aspect 2: The method of aspect 1, wherein the denatured plant protein comprises denatured pea protein.

Aspect 3: The method of aspect 1 or 2, wherein the polysaccharide comprises pectin.

Aspect 4: The method of any of aspects 1 to 3, wherein the denatured plant protein is present in the mixture in an amount of 5 to 50 weight percent, or 5 to 40 weight percent, or 5 to 30 weight percent, or 5 to 25 weight percent, or 8 to 15 weight percent, or 9 to 12 weight percent, based on the total weight of the mixture.

Aspect 5: The method of any of aspects 1 to 4, wherein the polysaccharide is present in the mixture in an amount of greater than 0 to 20 weight percent, or 0.1 to 20 weight percent, or 0.1 to 15 weight percent, or 0.1 to 10 weight percent, or greater than 0 to 5 weight percent, or 0.1 to 5 weight percent, or 0.1 to 2 weight percent, based on the total weight of the mixture.

Aspect 6: The method of any of aspects 1 to 5, wherein forming the fibrous structures comprises applying a shear force, preferably wherein the shear force is applied by stirring.

Aspect 7: The method of any of aspects 1 to 6, wherein the fibrous structures have an average length of 10 micrometers to 10 millimeters and an average diameter of 1 nanometer to 1000 micrometers.

Aspect 8: The method of any of aspects 1 to 7, wherein crosslinking the protein matrix comprises adding an enzymatic crosslinker, preferably transglutaminase, to the mixture.

Aspect 9: The method of aspect 8, wherein the enzymatic crosslinker is added in an amount effective to provide an active enzyme concentration of 0.001 to 1 weight percent, based on the total weight of the mixture.

Aspect 10: The method of any of aspects 1 to 9, further comprising denaturing a plant protein to provide the denatured plant protein.

Aspect 11: The method of aspect 10, wherein denaturing the plant protein comprises heating the plant protein at a temperature of 50 to 150° C. for 2 minutes to 24 hours.

Aspect 12: The method of any of aspects 1 to 11, further comprising adding one or more additives to the mixture.

Aspect 13: The method of aspect 12, wherein the additive comprises a lipid, an omega-3 fatty acid, vitamins, minerals, nutraceuticals, or a combination thereof.

Aspect 14: The method of any of aspects 1 to 13, wherein the meat structured protein product is a seafood analog, preferably a scallop analog.

Aspect 15: A meat structured protein product made by the method of any of aspects 1 to 14.

Aspect 16: The meat structured protein product of aspect 15, wherein the meat structured protein product exhibits a water holding capacity of greater than 90%, preferably greater than 92%.

Aspect 17: The meat structured protein product of aspect 15 or 16, wherein the meat structured protein product is porous, preferably wherein an average pore diameter is 3 to 300 micrometers, as determined using scanning electron microscopy.

Aspect 18: The meat structured protein product of any of aspects 15 to 17, wherein the meat structured protein product comprises fibrous structures having an average diameter of 10 to 200 micrometers and an aspect ratio of greater than 5.

Aspect 19: A meat structured protein product comprising: 5 to 25 weight percent of a denatured pea protein; 0.1 to 5 weight percent of pectin; 0.005 to 0.1 weight percent of enzymatically active transglutaminase; and 69.9 to 94.895 weight percent water; wherein weight percent of each component is based on the total weight of the meat structured protein product.

Aspect 20: The meat structured protein product of aspect 19 wherein the meat structured protein product is a seafood analog, preferably a scallop analog.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of making a meat structured protein product, the method comprising:
    combining a denatured plant protein and a polysaccharide in the presence of an aqueous solvent to provide a phase-separated mixture comprising
        a dispersed phase comprising the polysaccharide; and
        a continuous phase comprising the denatured plant protein;
    forming fibrous structures comprising the polysaccharide in a protein matrix comprising the plant protein at a temperature of less than 100° C.; and
    crosslinking the protein matrix to provide the meat structured protein product.

2. The method of claim 1, wherein the denatured plant protein comprises denatured pea protein.

3. The method of claim 1, wherein the polysaccharide comprises pectin.

4. The method of claim 1, wherein the denatured plant protein is present in the phase-separated mixture in an amount of 5 to 50 weight percent, based on the total weight of the phase-separated mixture.

5. The method of claim 1, wherein the polysaccharide is present in the phase-separated mixture in an amount of greater than 0 to less than or equal to 20 weight percent, based on the total weight of the phase-separated mixture.

6. The method of claim 1, wherein forming the fibrous structures comprises applying a shear force.

7. The method of claim 1, wherein the fibrous structures have an average length of 10 micrometers to 10 millimeters and an average diameter of 1 nanometer to 1000 micrometers.

8. The method of claim 1, wherein crosslinking the protein matrix comprises adding an enzymatic crosslinker to the phase-separated mixture.

9. The method of claim 8, wherein the enzymatic crosslinker is added in an amount effective to provide an active enzyme concentration of 0.001 to 1 weight percent, based on the total weight of the phase-separated mixture.

10. The method of claim 1, wherein the denatured plant protein is provided by heating a plant protein at a temperature of 50 to 150° C. for 2 minutes to 24 hours.

11. The method of claim 1, further comprising adding one or more additives to the mixture.

12. The method of claim 11, wherein the additive comprises a lipid, an omega-3 fatty acid, vitamins, minerals, nutraceuticals, or a combination thereof.

13. The method of claim 1, wherein the meat structured protein product is a seafood analog.

14. A meat structured protein product made by the method of claim 1, wherein the meat structured protein product exhibits a water holding capacity of greater than 90%; and wherein the meat structured protein product comprises fibrous structures having an average diameter of 10 to 200 micrometers and an aspect ratio of greater than 5.

15. The meat structured protein product of claim 14, wherein the meat structured protein product is porous.

\* \* \* \* \*